United States Patent Office 3,440,271
Patented Apr. 22, 1969

3,440,271
2,3-BIS-(NF₂)-2-HALOPROPANE NITRILE
Lawrence J. Engel, Dunellen, N.J., assignor to Esso Research and Engineering Company, a corporation of Delaware
No Drawing. Filed Jan. 31, 1962, Ser. No. 170,856
Int. Cl. C07c *121/52, 121/02*
U.S. Cl. 260—465.5                                4 Claims This invention relates to a novel kind of high-energy compound, 2,3-(difluoramino)-2-halopropane nitrile, useful in a rocket propellant.

In efforts to form 2,3-(difluoramino) propane nitrile, $CH_2(NF_2)CH_2(NF_2)CN$, difficulties were encountered because this compound was evidently unstable, as indicated by elimination of HF.

Now, in accordance with the present invention, more stable high-energy compounds are obtained by reacting an alpha halo acrylonitrile or 2-halopropene nitrile with tetrafluorohydrazine, $N_2F_4$, with surprisingly good results to form stabilized 2,3-(difluoramino)-2-halopropene nitrile in quantitative yields.

The 2-halopropene nitrile reactants have the following structural formula:

$$H-\underset{\underset{H}{|}}{C}=\underset{\underset{X}{|}}{C}-C\equiv N$$

wherein X represents a halogen substituent such as F, Cl, Br or I, preferably F or Cl attached to the alpha carbon atom with respect to the nitrile group, —C≡N. For the reaction of $N_2F_4$ with a propene nitrile having a halogen substituted for hydrogen on the alpha carbon, suitable reaction conditions are subatmospheric pressures in the range of 200 to 760 mm. Hg absolute, and reaction temperatures in the range of 100° to 200° C. for vapor phase reaction. The reaction time or residence period depends on the rate of reaction. The slow reaction may be carried out in 1 to 10 hours. A faster reaction may be obtained by increasing the proportion of $N_2F_4$ or increasing the pressure by addition of an inert gas, e.g. ethane, $CO_2$, He or $N_2$. For mixed phase or liquid phase reaction, inert liquid diluents, such as $CCl_4$, $CHCl_3$, and hydrocarbons, are used and the pressure may be increased to 450 p.s.i.a. or higher.

The 2-halopropene nitrile reactants are obtainable by addition of reaction of propene nitrile with a halogen to form 2,3-dihalopropane nitrile as product at moderate temperatures, then dehydrohalogenating said dihalo product at elevated temperatures.

Preparation of 2,3-(difluoramino)-2-halopropane nitrile is described as follows:

Example

Reaction of $N_2F_4$ with 2-chloropropene nitrile was carried out at the reaction temperature of 150° C. using 2 moles of $N_2F_4$ per mole of the nitrile reactant, and under a pressure of 300 mm. Hg absolute with 6 hours contact time in a 2-liter glass flask. Complete conversion of the nitrile reactant was obtained in the reaction represented by the following equation:

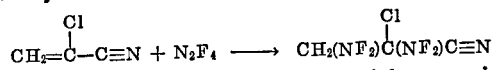

The product was isolated and recovered by vaporizing excess $N_2F_4$ from the reaction zone and distilling the residual product. Chemical analysis of the product checked the theory for $C_2H_2(NF_2)_2ClCN$.

TABLE I.—ELEMENTAL ANALYSIS OF PRODUCT

| Constituent | Theory, Wt. Percent | Found, Wt. Percent |
|---|---|---|
| C | 18.85 | 18.45 |
| H | 1.05 | 1.37 |
| Cl | 18.30 | 17.20 |
| N | 22.00 | 23.29 |
| F | 39.80 | 37.30 |
| F/N | 1.30 | 1.20 |

The infrared spectrum of the product indicated no C=NF configuration. The nuclear magnetic resonance fine line confirmed the structure of the product to be stable bis adduct of the 2-halopropene nitrile. No C=NF or C—F configuration was present.

Determinations of the energy values of the bis-($NF_2$)-2-halopropane nitriles show that when the halogen substituent is chlorine, the compound evaluated as a monopropellant has an ISP (specific impulse) of 217. When the product is 2,3-bis-($NF_2$)-2-fluoropropane nitrile, the ISP is 226.

The nitrile group contributes to the energy value of these bis-($NF_2$)-halopropane nitriles, and is a functional group that makes these compounds reactive for preparing intermediates that can be used in preparing binders.

The 2,3-bis-($NF_2$)-2-halopropane nitriles are useful in themselves as fuel oxidizers in formulating solid rocket propellants, such as the following:

TABLE II

Solid rocket propellant composite

| Component | Wt. percent |
|---|---|
| 2,3-bis-($NF_2$)-halopropane nitrile | 40 |
| Hexanitroethane | 47 |
| B powder | 3 |
| [$C_4H_6(NF_2)_{1.3}$]ₙ | 10 |

ISP=285 for chloro derivative.
ISP=289 for fluoro derivative.

In such composites, the metal fuel may be B, Al, Li, Be, Mg or other such high-energy metals, and compounds thereof. The oxygen oxidizers may be selected from a variety of nitro compounds and perchlorates. Various binders having high $NF_2$ contents can be used. The binder shown is formed by the addition reaction of $N_2F_4$ with polybutadiene.

What is claimed is:
1. 2,3-bis-($NF_2$)-2-halopropane nitrile.
2. 2,3-bis-($NF_2$)-2-chloropropane nitrile.
3. 2,3-bis-($NF_2$)-2-fluoropropane nitrile.
4. Method for preparing 2,3-bis-($NF_2$)-2-halopropane nitrile which comprises, reacting 2-halopropene nitrile with $N_2F_4$ under reaction conditions of temperature in the range of 100° to 200° C. and pressure in the range of 200 to 760 mm. Hg absolute for adding an $NF_2$ group to each of the carbon atoms linked together by a double bond, and recovering the resulting 2,3-bis-($NF_2$)-2-halopropane product.

References Cited

Hoffman et al.: Chem. Reviews, vol. 62, pp. 12 to 18 (1962).

LELAND A. SEBASTIAN, *Primary Examiner.*